Figure 4:
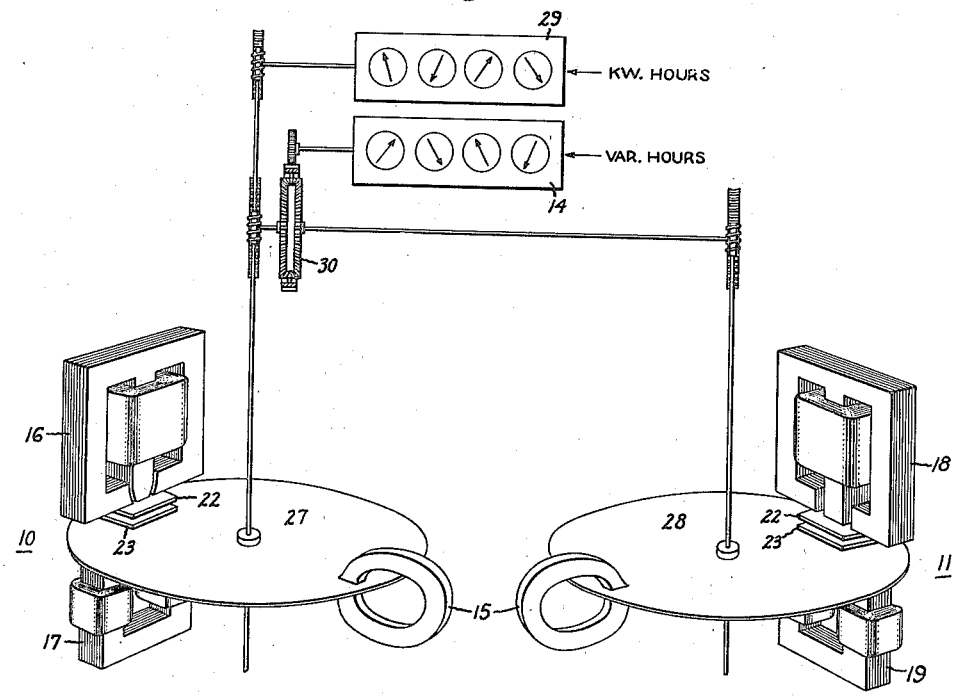

June 24, 1941.                H. M. WITHEROW                 2,247,109
                                 VAR METER
                            Filed March 2, 1940              2 Sheets-Sheet 1
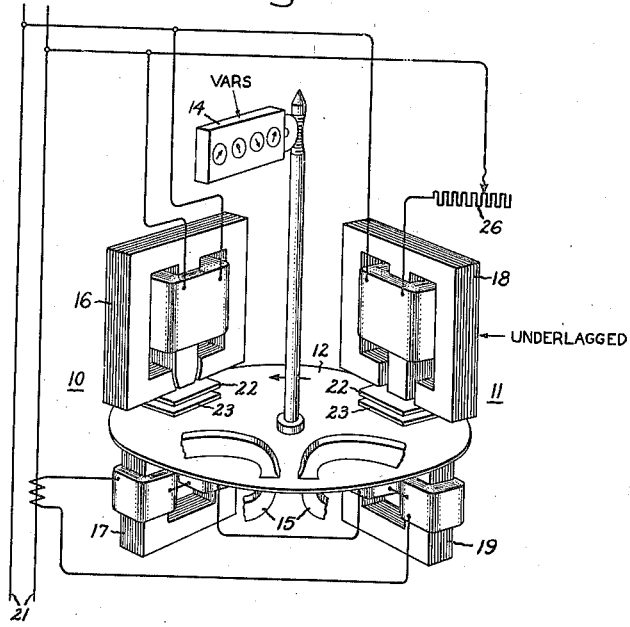
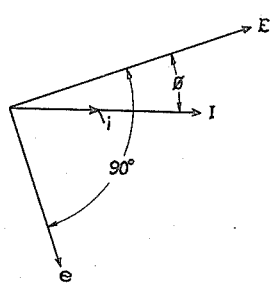
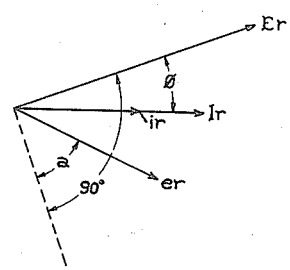
Inventor:
Harry M. Witherow,
by Harry E. Dunham
His Attorney.

Patented June 24, 1941

2,247,109

UNITED STATES PATENT OFFICE 2,247,109

VAR METER

Harry M. Witherow, Clifton, Mass., assignor to General Electric Company, a corporation of New York Application March 2, 1940, Serial No. 321,939

3 Claims. (Cl. 171—34)

My invention relates to apparatus for measuring the reactive volt amperes of single phase alternating current circuits. Such measurements are useful in connection with the establishment of rates for alternating current power when the power factor is taken into consideration.

In carrying my invention into effect I make use of an induction meter element designed to produce a measurement proportional to $AEI \cos \phi - BEI \sin \phi$ where E, I and $\cos \phi$ respectively represent the voltage, current and power factor of the metered circuit, and A and B are constants. I combine this with an induction wattmeter element producing a measurement proportional to $EI \cos \phi$ in such a way that the two $EI \cos \phi$ quantities cancel leaving a resultant measurement proportional to $EI \sin \phi$ or vars.

The features of my invention which are believed to be novel and patentable will be pointed out in the claims appended hereto. For a better understanding of my invention, reference is made in the following description to the accompanying drawings in which Fig. 1 represents one form of my invention where both induction measuring elements produce torques on the same meter disk. Fig. 2 shows vectors representative of current flux relations in the wattmeter element. Fig. 3 shows vectors representative of current and flux relations in the underlagged meter elements; and Fig. 4 represents an embodiment of my invention where the two meter elements drive separate disks and their measurements are subtracted by a differential and making available the measurement of both kw. hours and var hours.

As shown in Fig. 1, my var meter employs two induction meter driving elements 10 and 11 operating on the same disk armature 12. One of these elements 10 is adjusted as a watthour meter, i. e. its voltage flux lags behind the current flux by 90 degrees when the power factor of the circuit is unity. The second driving element 11 does not have this quadrature flux relation but is underlagged so that the voltage flux lags the current flux by some angle appreciably less than 90 degrees.

In the wattmeter element 10 the greater part of potential flux lagging is obtained in the usual way by using a voltage magnet 16 having high reactance and the remainder is obtained by a lag plate indicated at 22 in the potential magnet air gap. The voltage flux thus lags the voltage by 90 degrees and the voltage flux also lags the current flux produced by the current magnet 17 to 90 degrees less the power factor angle.

Thus in Fig. 2, E represents the voltage of line 21 and $e$ the potential flux of the meter element 10. I represents the line current and $i$ the current flux in phase therewith. $\phi$ represents the power angle. The torque of the wattmeter element 10 is $EI \cos \phi$.

The torque element 11 is constructed much the same as element 10. The smaller degree of lagging of the potential flux may be obtained by providing resistance 26 in the energizing circuit of the voltage magnet 18 and using larger air gaps between the middle and outer legs of the voltage magnet 18. The lag plate may be omitted if it is not needed for lag adjustment purposes. 19 represents the current magnet for element 11. The two voltage magnets are connected in parallel across the line 21 and hence in Fig. 3 we may represent the voltage applied to magnet 18 by the vector $Er$ or the same length and position as for the vector E of Fig. 2. The voltage flux $er$ however lags the voltage by 90 degrees minus the angle $a$ which in this example is made 45 degrees. The current flux $ir$ is in phase with the current $Ir$ but the current flux has been made larger than the current flux $i$ of the wattmeter element for reasons to be explained.

The torque of the underlagged element 11 is $EI \cos (\phi + a)$. This may be expanded thus $$EI \cos \phi \cos a - EI \sin \phi \sin a$$

Cos $a$ and sin $a$ have values fixed by the angle $a$ in the design of the meter. Cos $a$ may thus be represented by a constant A and sin $a$ by a constant B.

Thus the torque of meter element 11 may be written $AEI \cos \phi - BEI \sin \phi$. In the example given above the angle $a$ was made 45 degrees in which case its cosine and sine are equal, namely .707. Hence the torque of meter element may be written $.707 EI \cos \phi - .707 EI \sin \phi$.

If now we increase the torque of element 11 in comparison to the torque of element 10 in the ratio $1/.707$ the torque of element 11 becomes $EI \cos \phi - EI \sin \phi$. If now the torques of the two elements acting on the disk 12 be opposed thus $$EI \cos \phi - (EI \cos \phi - EI \sin \phi) = \\ EI \cos \phi - EI \cos \phi + EI \sin \phi$$

the resultant differential torque becomes $EI \sin \phi$ which is the reactive component or vars. The direction of meter torque may be reversed by reversing either the current or voltage connections but not both. In Fig. 1 it is assumed that the torque of meter element 11 is reversed by reason of the connections of the voltage coil.

Hence in my meter of the form shown in Fig. 1 the meter element 11 is designed so that its AEI cos $\phi$ torque component is equal to the torque of wattmeter element 10, and the torques of the two elements are opposed so that the register 14 registers in vars. The torque of meter element 11 may be increased by adding more turns on its current magnet 19 or in any other suitable way. In the example given the current flux of meter 11 was increased in proportion to the current flux of meter 10 in the ration 1/.707. Instead of this I could have increased the voltage flux of meter element 11 or decreased either or both of the fluxes of meter element 10 such that its torque is made equal to the AEI cos $\phi$ torque factor of meter element 11. This would mean that at unity power factor when the factor $BEI \sin \phi = 0$ the torques of the two meters must be equal, and that the extent to which the torque of the underlagged meter element is to be increased in relation to the other element by variation of fluxes, etc. is the same as the deficiency in the torque of the underlagged meter element which would otherwise exist at unity power factor by reason of its being underlagged.

It is not essential that the angle $a$ be made 45 degrees. If, for example, it is made 30 degrees, the torque of meter element 11 would be written $.866 EI \cos \phi - .5 EI \sin \phi$. Increasing its torque in relation to that of meter element 10 by the factor 1/.866 and opposing the torques of the two meter elements, the resultant torque is $.5/.866 EI \sin \phi = .565 EI \sin \phi$. The factor .565 can be taken care of by using the proper gearing to the meter register 14.

Such a reactive component meter is less expensive than an ordinary watthour meter together with an external voltage phase shifting device for obtaining the var measurement and is less subject to wave form errors. In Fig. 1, 15 represents the permanent damping magnets. 23 represents light load adjustment plates. One of these plates may be omitted but both are preferably included as they will be useful as a means of final adjustment of the torque relations between the two meter elements.

In Fig. 4 the two stationary meter driving elements similar to those of Fig. 1 are represented as driving separate armatures 27 and 28. As before, the torque of meter element 10 is EI cos $\phi$ and since this meter device is now free to operate, it has a speed proportional to EI cos $\phi$ and hence the kw. hours may be registered by it on a register 29. Meter element 11 produces a torque and measurement speed proportional to $AEI \cos \phi - BEI \sin \phi$. Hence by introducing the necessary factor to make the difference in the driving effort and the speeds of the two meter elements equal or proportional to $EI \sin \phi$ the latter may be registered on register 14 by driving it through a differential 30 which subtracts the rotation produced by one meter from that of the other. This embodiment of the invention is useful where, as usual, a registration of kw. hours is desired.

The average power factor may be calculated directly from the readings of the two registers as integrated over a given period of time. For example, if, during a week, register 29 increases its reading by 10,000 and register 14 by 5,000, the average power factor angle is the angle whose tangent is 5,000/10,000 or the angle of 26° 34', and the average power factor is $$\cos 26° 34' = .894$$

Thus $$EI \sin \phi \text{ hours} = 5,000$$

$$EI \cos \phi \text{ hours} = 10,000$$

$$\frac{\sin \phi}{\cos \phi} = \tan \phi = .5$$

$$\phi = 26° 34'$$

Average power factor $= \cos \phi = .894$.

What I claim as new and desire to secure by Letters Patent of the United States is:

1. Apparatus for measuring reactive component hours of single phase circuits comprising a pair of induction meter driving elements, each having voltage and current electromagnets, one of said elements being designed to produce a wattmeter torque proportional to EI cos $\phi$ and the other element being underlagged to produce a torque proportional to $AEI \cos \phi - BEI \sin \phi$, where E and I represent the voltage and current of the circuit to be metered and $\phi$ the phase angle between them, and A and B constants, means including rotary induction armature means differentially responsive to the driving effort of said driving elements, the torques of said two driving elements being so related that the torque of the wattmeter element is equal to the AEI cos $\phi$ torque component of the other element whereby the resultant meter operation is proportional to EI sin $\phi$.

2. Apparatus for measuring the reactive component hours of single phase circuits comprising a pair of induction meter driving elements each having a voltage electromagnet and a current electromagnet, a common rotary induction armature on which both of said driving elements act, one of said driving elements being designed to produce a wattmeter torque proportional to EI cos $\phi$ and the other meter element being underlagged to produce a torque proportional to $AEI \cos \phi - BEI \sin \phi$ where E and I represent the voltage and current of the circuit to be metered and $\phi$ the phase angle between them, and A and B represent constants determined by the extent of underlagging of the underlagged element, said elements producing opposing torques on said armature and being proportioned such that the torque of the wattmeter torque element is equal to the AEI cos $\phi$ torque component of the underlagged element.

3. Apparatus for measuring the reactive component hours of single phase circuits and the watthours thereof, comprising an integrating watthour meter and an integrating meter of the induction watthour meter type but being underlagged so as to rotate at a rate proportional to $AEI \cos \phi - BEI \sin \phi$ where E and I represent the voltage and current of the circuit to be metered, $\phi$ the phase angle between them, and A and B constants, a differential connected to have its two sides driven by said watthour meter and underlagged meter respectively and a reactive-component hour register driven from said differential at a rate proportional to the difference in rates of said two meters, the two sides of said differential being driven at the same rates when $\phi$ equals zero.

HARRY M. WITHEROW.